(12) United States Patent
Tanaka et al.

(10) Patent No.: US 8,918,281 B2
(45) Date of Patent: *Dec. 23, 2014

(54) NAVIGATION APPARATUS

(71) Applicant: DENSO CORPORATION, Kariya (JP)

(72) Inventors: Hiroshi Tanaka, Kariya (JP); Seiji Kato, Toyota (JP)

(73) Assignee: DENSO CORPORATION, Kariya (JP)

( * ) Notice: Subject to any disclaimer, the term of this patent is extended or adjusted under 35 U.S.C. 154(b) by 270 days.

This patent is subject to a terminal disclaimer.

(21) Appl. No.: 13/659,584

(22) Filed: Oct. 24, 2012

(65) Prior Publication Data

US 2013/0282273 A1   Oct. 24, 2013

(30) Foreign Application Priority Data

Oct. 26, 2011   (JP) ................................. 2011-235102

(51) Int. Cl.
  G01C 21/34   (2006.01)
  G01C 21/36   (2006.01)
(52) U.S. Cl.
  CPC ............ G01C 21/34 (2013.01); G01C 21/3632 (2013.01)
  USPC ........... 701/437; 701/424; 701/428; 701/450; 701/457; 340/990; 340/995.2; 340/995.27
(58) Field of Classification Search
  USPC ......... 701/409, 428, 437, 450, 457, 532, 533, 701/540; 340/990, 995.14, 995.15, 995.2, 340/995.27

See application file for complete search history.

(56) References Cited

U.S. PATENT DOCUMENTS

2007/0055444 A1   3/2007   Mikame

FOREIGN PATENT DOCUMENTS

JP   A-2005-156278       6/2005
JP   2011007504 A   *   1/2011

OTHER PUBLICATIONS

U.S. Appl. No. 13/359,681, filed Jan. 27, 2012, Noro et al.

* cited by examiner

*Primary Examiner* — John R Olszewski
*Assistant Examiner* — Gerrad A Foster
(74) *Attorney, Agent, or Firm* — Posz Law Group, PLC

(57) ABSTRACT

A navigation apparatus provides a guidance about an exiting road of a circular intersection based on a prestored road and a learned road. The navigation apparatus determines whether or not the learned road is included in connection roads of the circular intersection. When the learned road is not included in the connection roads of the circular intersection, the navigation apparatus provides the guidance about the circular intersection in an exit number mode. When the learned road is included in the connection roads of the circular intersection, the navigation apparatus device provides the guidance about the circular intersection in a learned road guidance mode.

6 Claims, 6 Drawing Sheets

LEARNED ROAD IS NOT INCLUDED IN CONNECT-ROADS

LEARNED ROAD IS INCLUDED IN CONNECT-ROADS

ENLARGED VIEW OF CIR INTXN IN EXIT-NUMBER GUIDE

ENLARGED VIEW IN INTXN GUIDE

NAVIGATION APPARATUS

CROSS REFERENCE TO RELATED APPLICATION

The present application is based on and claims priority to Japanese Patent Application No. 2011-235102 filed on Oct. 26, 2011, disclosure of which is incorporated herein by reference.

TECHNICAL FIELD

The present disclosure relates to a navigation apparatus that performs route guidance based on a map data and a learned road data. The learned road data is obtained based on vehicle travel experiences.

BACKGROUND

A known navigation apparatus learns a new road unregistered in a ready-made map data based on a travel trace of a movable body such as a vehicle and the like. For example, a road learning function learns a new road (a learned road) unregistered in the map data, by generating and storing the new road based on a travel trace from a point where the present position of the movable body departs from a prestored road in the map data to a point where the present position of the movable body returns to the prestored road in the map data.

As for an in-vehicle navigation apparatus, a route guidance method for circular intersection is known (see JP-2007-71601A1 corresponding to US 2007/0055444A1). The circular intersection is, for example, a traffic, circle, a roundabout, a rotary etc. A conventional circular intersection guidance is, for example, so called an exit-number-type circular intersection guidance, which tells how many exits there are with respect to the entrance of the circular intersection. For example, a message indicating that please exit from the second exit ahead may be provided.

In JP-2005-156278A1, a circular intersection is transformed to an intersection in which a circular road is a straight road and multiple connection roads are connected to this straight road. Then the transformed intersection is displayed, and additionally, an exit number is used to indicate where an exiting road is located with respect to an entrance road.

The inventors of this application have found out the following. Since the above conventional circular intersection guidance leaves a guidance about a learned road out of consideration, various problems may emerge when the conventional circular intersection guidance is applied to a circular intersection to which both of the road (prestored road) prestored in the map data and the learned road obtained by the road learning function are connected.

For example, let us assume that both of the prestored road and the learned road are present as exits (exiting roads) of a circular intersection. In this case, the circular intersection guidance using the exit number may assign a series of exit numbers to the exiting roads (the prestored road and learned road), and may provide the guidance about an exiting road of the circular intersection based on the exit numbers. In the above situation, because the exit number of the learned road is added, the exit numbers of the prestored roads may be changed or the exit numbers may not arranged in ascending order in the heading direction of the vehicle. Thus, a user may have a difficulty in grasping the guidance about the exiting road. Moreover, if a navigation apparatus updates the exit numbers of the circular intersection in accordance with its own rule, the updated exit number may not coincide with actual exit numbers.

SUMMARY

In view of the foregoing, it is an object of the present disclosure to provide a navigation apparatus that can perform appropriate route guidance in a circular intersection even when there is a learned road in the circular intersection.

According to an example of the present disclosure, a navigation apparatus for performing a route guidance based on a ready-made map data and a learned road data when an own vehicle is traveling is provided. The ready-made map data stores a prestored road. The learned road data stores a learned road. The learned road is generated based on a movement trace of the own vehicle from a point where present position of the own vehicle departs from the prestored road or the already-registered learned road to a point where the resent position of the own vehicle returns to the prestored road or the already-registered learned road. The navigation apparatus includes a guidance control device and a determination device. When a set guidance route passes through a circular intersection, the guidance control device provides a user with a guidance about an exiting road of the circular intersection at a predetermined timing. The determination device determines whether or not the learned road in the learned road data is included in connection roads of the circular intersection serving as a guidance target of the guidance control device, wherein the connection roads of the circular intersection are roads connected to the circular intersection. When the determination device determines that the learned road in the learned road data is not included in the connection roads of the circular intersection, the guidance control device provides the guidance about the circular intersection in an exit number mode. In the exit number mode, the guidance control device provides the guidance about the exiting road of the circular intersection by providing the user with an exit number of the exiting road from among exit numbers of the connection roads of the circular intersection. When the determination device determines that the learned road in the learned road data is included in the connection roads of the circular intersection, the guidance control device provides the guidance about the circular intersection in a learned road guidance mode. In the learned road guidance mode, the guidance control device provides the guidance about the exiting road of the circular intersection without providing the user with the exit number. The learned road guidance mode is distinct in guidance content from the exit number mode.

According to the above navigation apparatus, the modes of providing the guidance about the exiting road are distinguished depending on whether or not the learned road, which is obtained by a road learning function, is included in the connection roads of the circular intersection. Specifically, when the learned road is not included in the connection roads of the circular intersection, the navigation apparatus provides a user with the guidance about the circular intersection in the exit number mode by using the exit numbers set to the prestored roads. When the learned road is included in the connection roads of the circular intersection, the navigation apparatus provides a user with the guidance about the circular intersection in the mode in which the exit number is not provided. Because of the above, when the learned road connected to the circular intersection is added, an exit number different from the previous exit number is not provided to the user in the guidance about the exiting road. An occurrence of user confusion is prevented.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments will be described with reference to the accompanying drawings. It should be noted that embodiments of the present disclosure are not limited to the below-illustrated embodiments and can have various forms.

(Configuration of Navigation Apparatus 1)

Figure 1:
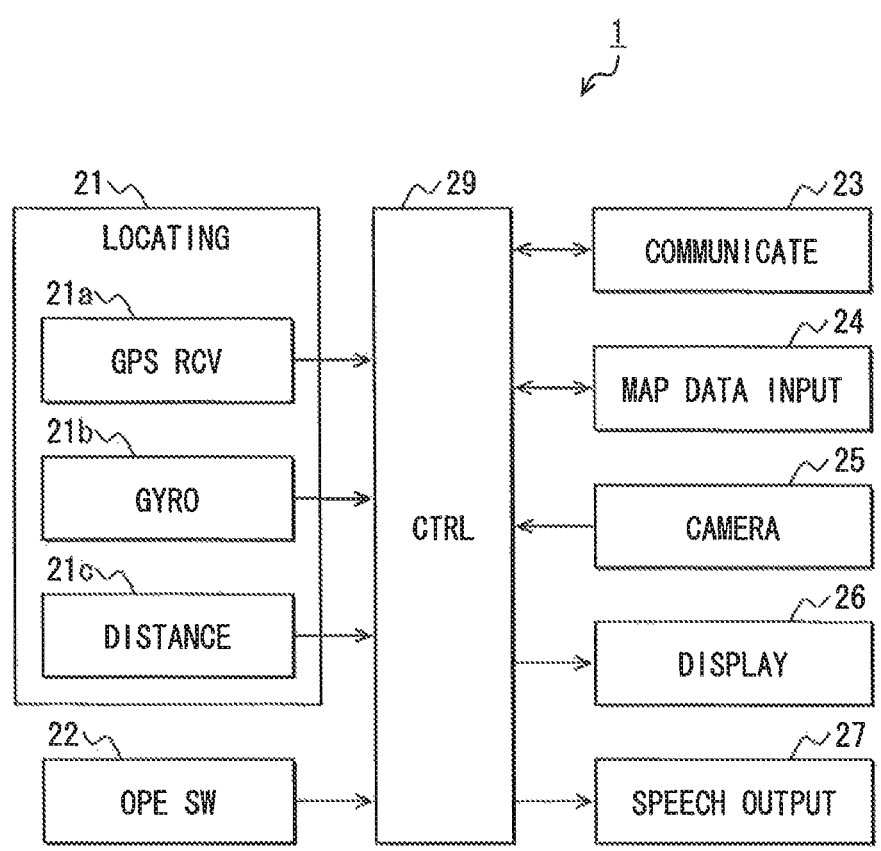
FIG. 1 is a block diagram illustrating a navigation apparatus.

A navigation apparatus 1 of one embodiment is a navigation system mounted to a vehicle (also referred to as a own vehicle). As shown in FIG. 1, the navigation apparatus 1 includes a position detection device 21 (also called a locating device) for detecting present position of the vehicle, a group of operation switches 22 for a user to input various instructions, a communication device 23 for communicating with an external device, a map data input device 24 for inputting a data from a mass storage medium storing map data, programs and the like, a camera 25 mounted to a vehicle, a display device 26 for displaying a map and a variety of information, a speech output device 27 for outputting various guidance speeches, and a controller 29.

The position detection device 21 includes a global positioning system (GPS) receiver 21a for receiving a signal from GPS artificial satellites, a gyroscope 21b for outputting a detection signal according to rotation movement and angular velocity of the vehicle, and a distance sensor 21c for outputting a signal indicative of traveling distance of the vehicle. Based on output signals from these sensor 21a, 21b, 21c, the controller 29 calculates a present position, a heading direction, a speed, and the like. There are various methods for obtaining the present position based on the output signal of the GPS receiver 21a, and any method may be employed. For example, a point positioning method, a relative positioning, or the like may be employed.

The group of operation switches 22 includes a touch panel integrally provided on a display of the display device 26, a mechanical key switch provided on a periphery of the display device 26, or the like. The communication device 23 connects to a public communication network by performing wireless communications, and performs communications with an external device connected to the public communication network.

The map data input device 24 inputs various data to the controller 29. The various data may include a data stored in a map data storage medium, and a data stored in an auxiliary storage medium. The auxiliary storage medium is provided to store a learned road data, which relates to a learned road acquired by a road learning function.

The map data storage medium stores a ready-made map data provided from a map data provider. The ready-made map data includes various data such as a road data, a map data, a data for map matching, a data for route guidance, a program for operation of the navigation apparatus 1, a design image data, and the like. The road data indicates connections of roads with use of nodes and links. The node may correspond to a particular point such as an intersection and the like. The link connects nodes. The map data includes a graphic data for displaying a map image.

The auxiliary storage medium for storing the learned road data may include a storage (e.g., a hard disk drive, a non-volatile semiconductor memory) that can electrically or magnetically rewrite the stored information and can retain the stored information even when not powered. When the road learning function of the navigation apparatus of one embodiment detects a new road, the learned road data of the detected new road is recorded and stored in the auxiliary storage medium. In the above, the new road is a road which is not present in the prestored roads in the map data and the already-registered learned roads in the auxiliary storage medium. The learned road data includes information indicative of connections of roads with use of (i) nodes corresponding to points connected to the prestored roads and (ii) links connecting the nodes. The learned road data further includes information indicative of link shapes and the like.

The camera 25 mounted to a vehicle may be a video camera for capturing an image (video) of a vehicle periphery. The image captured by the camera 25 can be used to identify exit numbers of a circular intersection. The display device 26 may be a color display device and may include a liquid crystal display or the like. The display device 26 can display various images in accordance with a video signal from the controller 29. The display device 26 may be used to display a map image, a guidance route from a departure point to a destination point, a mark indicative of the present position of the vehicle, other guidance information, and the like. The speech output device 27 notifies a user of a variety of information by speech output. Because of this, both of the display of the display device 26 and the speech output of the speech output device 27 can be used to provide a user with various route guidance's such as a direction sign guidance and the like.

The controller 29 may include an information processing device (e.g., a microcomputer) as a main component. The controller 29 may include a CPU, a ROM, a RAN, an I/O, a bus line connecting the foregoing components, and the like. The controller 29 controls the above-mentioned devices. The controller 29 performs various processes based on the data or the program, which are read from the ROM, the map data input device 24 or the like.

(Operation)

Processes performed by the controller 29 will be described. Navigation-related processes include a map display process, a route guidance process and the like. In the map display process, first, the controller 29 calculates the present position of the own vehicle based on the detection signal from the position detection device 21. Thereafter, the controller 29 reads a map data around the present position from the map data input device 24, generates a map image based on the read map data, and displays the map image around the present position on the display device 26. Additionally, the controller 29 displays a present position mark indicative of the detected present position of the own vehicle over the map image on the display device 26, and moves the present position mark and/or scrolls the map image in response to movement of the own vehicle.

In the route guidance process, when the user operates the group of operation switches 22 and sets the destination point, the controller 29 sets the present position of the vehicle to the departure point and retrieves an optimum route from the departure point to the destination point by using the map data, which is read from the map data input device 24. Then, the optimum route obtained by the route retrieval is set to a guidance route, and the guidance route is displayed over the map image on the display device 26. Thereafter, in response to the movement of the own vehicle, the controller 29 outputs guidance information in the form of display or speech at a predetermined timing, so the vehicle can travel to the destination point along the guidance route.

In the present embodiment, the navigation apparatus 1 has a road learning function. The road learning function generates a new road data based on a movement trace when the vehicle travels an area other than the prestored roads, which are roads registered in the map data, and the already-registered learned roads. The road learning function registers the generated new road data as a learned road data in the auxiliary storage medium of the map data input device 24. The controller 29 reads out the learned road data registered in the auxiliary storage medium and the prestored road data in the map data, and performs processing so that the learned road data and the prestored road data have consistency as one map data. Thereafter, the controller 29 uses the learned road data and prestored road data to perform the map display process and the route guidance process.

Specifically, the controller 29 regularly specifies the present position with the position detection device 21 during the traveling of the own vehicle, and generates the learned road data based on the movement trace from a point where the own vehicle departs from an area of the prestored road in the map data or the already-registered learned road to a point where the own vehicle returns to the prestored road in the map data or the already-registered learned road. The controller 29 records the generated learned road data in the auxiliary storage medium. This learned road data includes information on connections of roads represented by nodes and links. The node may correspond to a point (e.g., a departed point and a returned point) connected to a link of the prestored road. Specially, the departed point is a point where the vehicle departs from the prestored road or the already-registered learned road. The returned point is a point where the vehicle returns to the prestored road or the already-registered learned road. The link connects the nodes. The learned road data further include information on a group of coordinate points indicative of shape of the road between the departed point and the returned point.

First Embodiment

Figure 2:
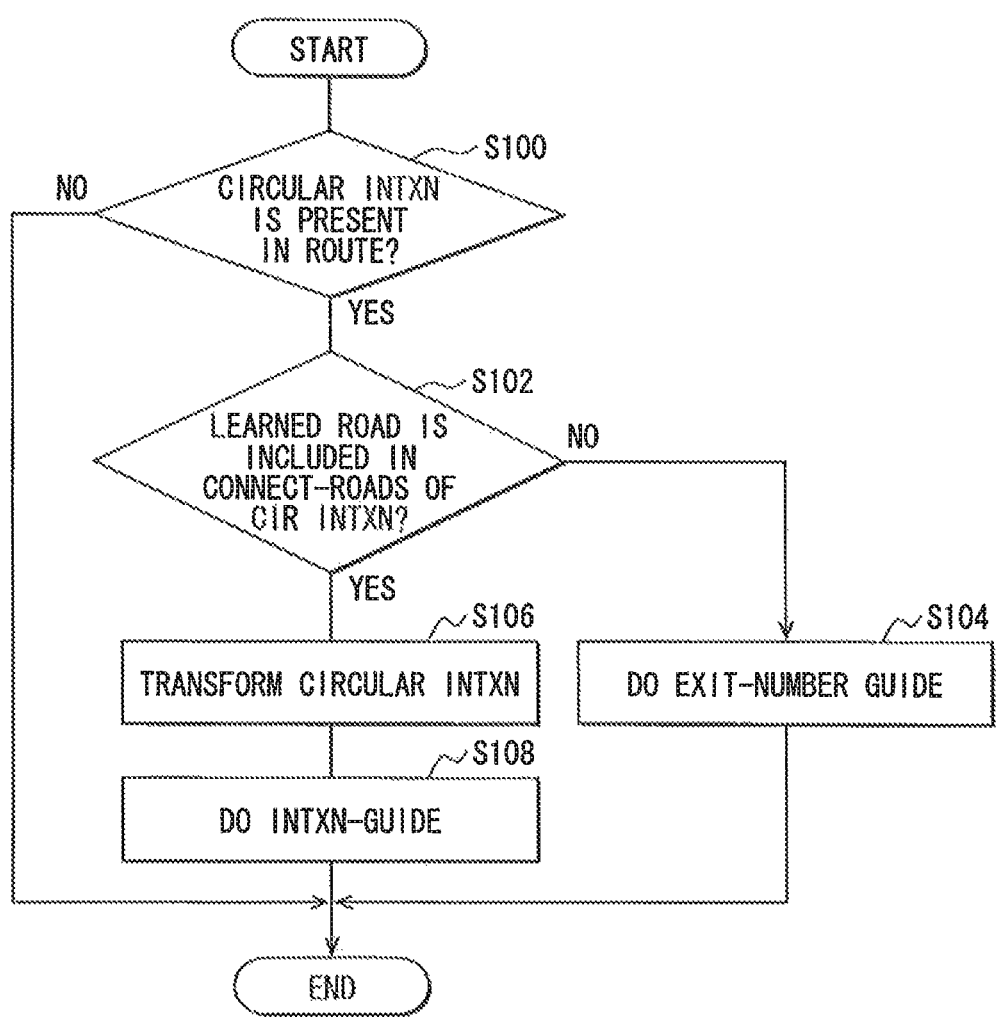
FIG. 2 is a flowchart illustrating a circular intersection guidance process of a first embodiment.

Now, a circular intersection guidance process will be described with reference to FIG. 2. FIG. 2 is a flowchart illustrating the circular intersection guidance process of a first embodiment. The circular intersection guidance process is performed as part of the route guidance process.

At S100, the controller 29 determines whether or not there is a circular intersection in the guidance route from the present position to the destination point. When there is the circular intersection in the guidance route (YES at S100), the process proceeds to S102. When there is no circular intersection in the guidance rout, this circular intersection guidance process is ended.

At S102, the controller 29 refers to the road data about connection roads of the circular intersection in the guidance route, and determines whether or not there is the learned road that is registered in the learned road data as the connection of the circular intersection. In other words, the controller 29 determines whether or not the learned road is included in the connection roads of the circular intersection. In the above, the connection roads of the circular intersection are roads connected to the circular intersection. When the learned road is not included in the connection roads of the circular intersection (NO at S102), in other words, when all the connection roads of the circular intersection are the prestored roads (NO at S102), the process proceeds to S104. When the learned road is included in the roads connected to the circular intersection (YES at S102), the process proceeds to S106.

At S104, at a time when the vehicle reaches a predetermined distance from the circular intersection, the controller 29 performs an exit number guidance for the circular intersection. This exit number guidance is a guidance indicating what number exiting road of exiting roads of the circular is a road from which the vehicle is to exit the circular intersection. In the above, the exit road number may be counted with respect to the entrance road. In the exit number guidance, for example, a message "please goes into an exiting road "the first exit" is provided to a user. After the exit number guidance, this circular intersection guidance process is ended.

As described above, when the learned road is present as the connection road of the circular intersection in the guidance route, the process proceeds to S106. At S106, the circular intersection in the road data, in which a circular part of the circular intersection is connected to the connection roads, is transformed to an intersection in which a road corresponding to the circular part intersects with a road corresponding to the connection road. For example, in the transformed intersection: the road corresponding to the circular part extends longitudinally; the road corresponding to the connection road extends laterally; and the above longitudinal and lateral roads intersect with each other. At S108, at a time when the vehicle reaches a predetermined distance from of the intersection corresponding to the exit (i.e., intersection of the circular part and the connection road) of the circular intersection, the controller 29 performs intersection guidance in the circular intersection. This intersection guidance in the circular intersection is distinct in guidance manner from the above-mentioned exit number guidance. Specifically, in the intersection guidance in the circular intersection, the exit number is not provided to a user. In stead, a position of or a distance to the intersection corresponding to the exit of the circular intersection, and a route direction at the intersection corresponding to the exit of the circular intersection are provided as guidance to a user. For example, a message "please go ahead X meters and turn left" may be provided. After the intersection guidance, the circular intersection guidance process is ended.

Figure 3A:
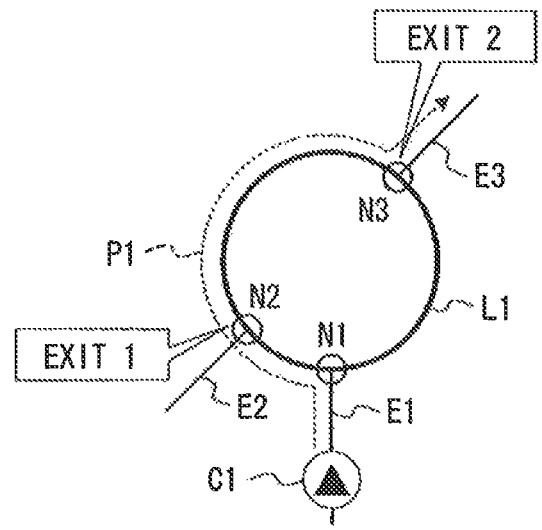
FIG. 3A is a diagram illustrating a guidance route when a learned road is not included in connection roads of a circular intersection.
Figure 3B:
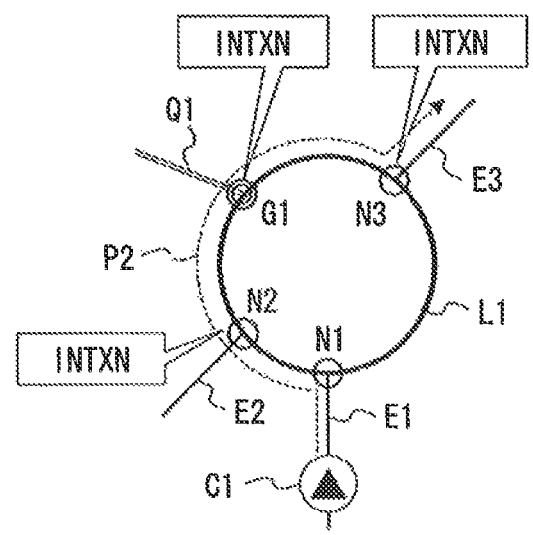
FIG. 3B is a diagram illustrating a guidance route when a learned road is included in connection roads of a circular intersection.

In the above, the circular intersection guidance process has been described. Next, specific examples of the guidance at S104 and S108 will be described with reference to FIG. 3A to 3B. FIGS. 3A and 3b are diagrams schematically illustrating routes passing through circular intersections. Specifically, FIG. 3A illustrates a case where the learned road is included in the connections roads of the circular intersection. FIG. 3B illustrates a case where the learned road is not included in the connection roads of the circular intersection.

In FIGS. 3A, and 3B, C1 denotes the present position of the own vehicle. L1 denotes a link corresponding to a circular part of the circular intersection. Each of N1, N2 and N3 denotes a node corresponding to a connection point at which the connection road provided as the prestored road in the ready-made map data connects to the circular part. This node is also refers to as a prestored road. Among N1 to N3, the node N1 is a presorted node corresponding to the entrance of the circular intersection and is connected to the link E1 of the prestored road. The nodes N2 and N3 are prestored nodes (also called herein existing nodes) corresponding to exits of the circular intersection. The node N2 is connected to the link E2 of a prestored road. The node N3 is connected to the link E3 of a prestored road. In FIG. 3B, G1 denotes a node (learned node) of a connection point at which the learned road registered by the road learning function is connected to the circular part of the circular intersection. Specifically, the node G1 is a learned node corresponding to an exit of the circular intersection. A link Q1 of the learned road is connected to the node G1.

(1) One Example of Exit Number Guidance (S104)

FIG. 3A assumes a guidance route P1, which goes through the link E1 of the prestored road, enters the circular intersection from an entrance at the prestored node N1, goes through the link L1, and exits the circular intersection from an exit at the prestored node N3. In the case of FIG. 3A, since all the connection roads of the circular intersection are the prestored roads, and since the learned road is not included in the connection roads of the circular intersection the exit number guidance at S104 is performed.

In the exit number guidance, the exit number corresponding to the exit connected to the prestored road (the prestored road) is used to provide the user with the exit number of the exit, from which the vehicle is to exit the circular intersection. In FIG. 3A, the exit numbers are assigned to the nodes in order of increasing distance from the entrance, so that the exit numbers are consecutive. Specifically, the prestored node N2 has the exit number 1. The prestored node N3 has the exit number 2. When the guidance about the exit road instructs exiting from the prestored N3 and going to the link E3, a massage "please go to the exiting road the exit 3" is provided to the user.

(2) One Example of Intersection Guidance in Circular Intersection (S108)

FIG. 3B illustrates a guidance route P2, which goes through the link E1 of the prestored road, enters the circular intersection from the prestored node N1, goes through the link L1, exits from the prestored node n3, and goes through the link E3 of the prestored road. In the case of FIG. 3B, the link Q1 of the learned road is included in the connection roads of the circular intersection, the intersection guidance at S108 is performed.

In the intersection guidance in the circular intersection, an exit guidance using an exit number like the above-described exit number guidance is not performed. In stead, each node N2, G1, N3 corresponding to the exit of the circular intersection is treated as an intersection. For example, before the prestored node N3 serving as the exit, a message indicative of (i) the position of the intersection serving as the exit and (ii) the route direction is notified. For example, a message "go X meters ahead and turn left" is notified.

Now, let us assume a situation where exit numbers are set to all of the exiting roads of the circular intersection, where all of the exiting roads include the learned road. In the above, the exit numbers are set as follows: the prestored node N2 becomes an exit 1; the learned node G1 becomes an exit 2; and the prestored node N3 becomes an exit 3. Here, if it is assumed that the link Q1 of the learned road and the node C1 are deleted by a user, the exit number of the prestored node N3 is changed from the exit 3 to the exit 2, and as a result, the user is confused. Likewise, if an exit corresponding to a new learned road connected to the circular intersection is added, the exit numbers are changed to new ones, and a result, the user is confused. In order to avoid the above confusions, when the learned road is included in the connection roads of the circular intersection, the exit guidance using the exit number is not performed. There may be various situations that cause the user to delete the learned road information (e.g., Q1 and C1). Such situation is, for example, that the road allows passage during only a specified period, or that the user unintentionally traveled a private road.

Figure 4A:
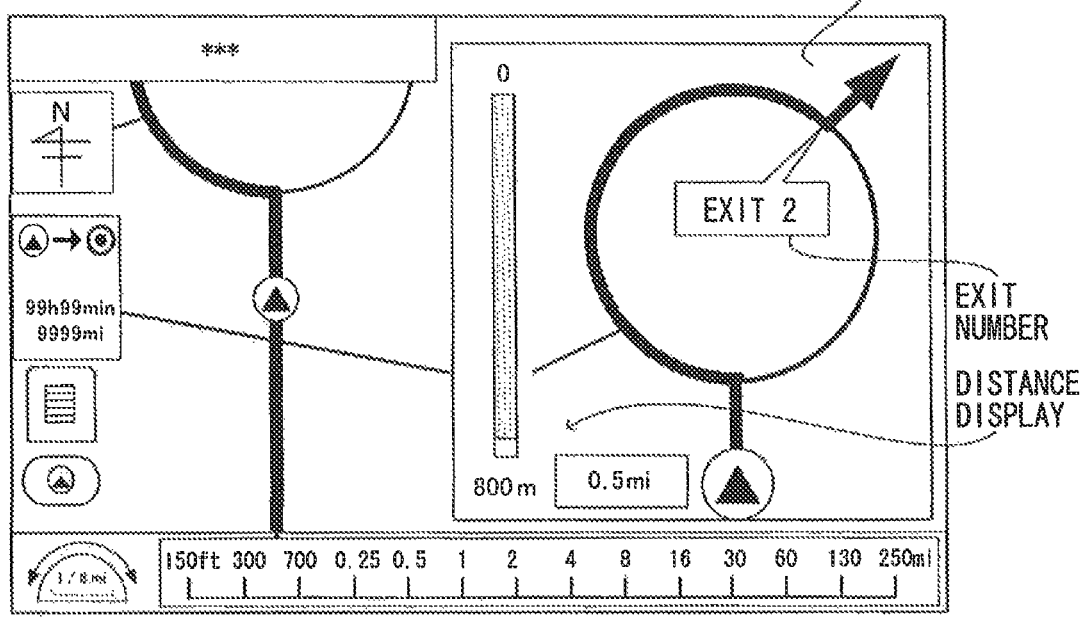
FIG. 4A is a diagram illustrating a display of a circular intersection when a learned road is not included in connection roads of a circular intersection.
Figure 4B:
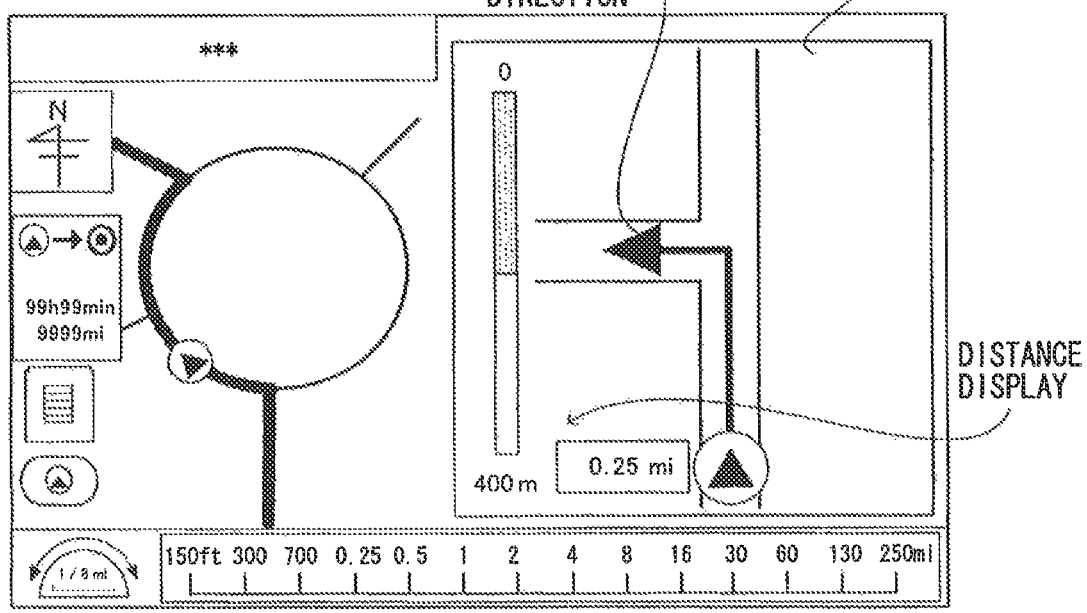
FIG. 4B is a diagram illustrating a display of a circular intersection when a learned road is included in connection roads of a circular intersection.

Next, specific examples of guidance images displayed at the guidance at S104, S108 will be described with reference to FIGS. 4A and 4B. FIGS. 4A and 4B are diagrams illustrating enlarged views of circular intersections displayed on the display device 26 when a guidance about an exiting road of a circular intersection is provided in the route guidance process.

FIG. 4A illustrates a case where the learned road is not included in the connection roads of the circular intersection. In the case of FIG. 4A, an enlarged view of the circular intersection is popped up on a large-scale map image at a predetermined timing before the own vehicle reaches the circular intersection in the guidance road. This enlarged view, displays (i) a circular part and connection roads of the circular intersection, (ii) a symbol mark indicative of the present position of the own vehicle, and additionally, (iii) a distance display indicative of a distance to the exit of the circular intersection, (iv) the exit number corresponding to the exiting road to which the vehicle travel, and (v) the others.

FIG. 4B illustrates a case where the learned road is included in the connection roads of the circular intersection. In the case of FIG. 4B, an enlarged view is popped up on a large-scale map image at a predetermined timing before the own vehicle reaches the circular intersection in the guidance road. The enlarged view displays a longitudinal-lateral intersection transformed from the circular intersection. In the displayed longitudinal lateral intersection, a longitudinal straight road and a lateral straight road intersect with each other. Specifically, the enlarged view displays the intersection at which a longitudinal direction road corresponding to the circular part of the circular intersection (on which the vehicle is traveling) intersects with a lateral direction road corresponding to the exiting road of the circular intersection. Additionally, the enlarged view displays a symbol mark indicative of the present position of the own vehicle, a distance display indicative of the distance to the intersection, an arrow indicative of the route direction at the intersection, and others.

Second Embodiment

Processes performed by the controller 29 will be described with reference to FIGS. 5 and 6.

Figure 5:
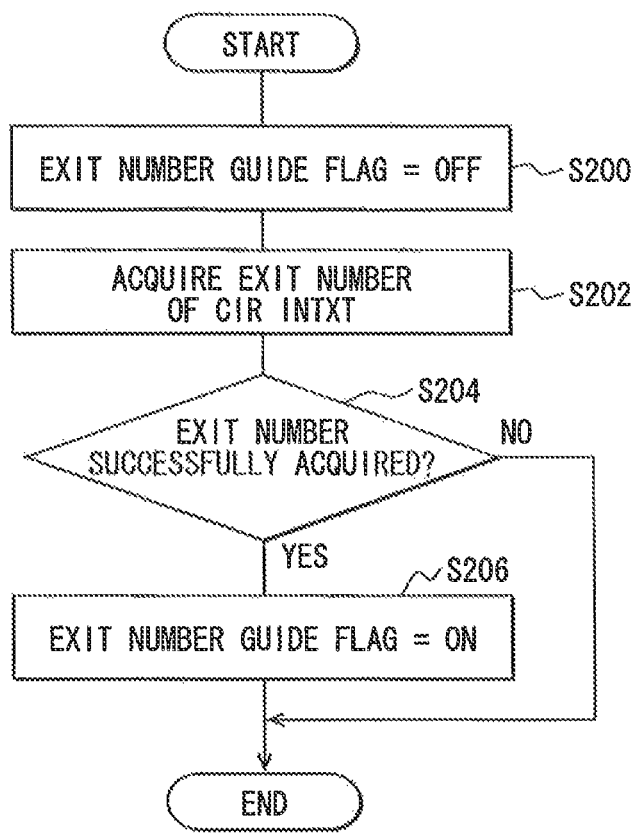
FIG. 5 is a flowchart illustrating an exit number acquisition process.

FIG. 5 is a flowchart illustrating an exit number acquisition process. For example, the exit number acquisition process is performed after a new learned road connected to the circular intersection is registered in the learned road data.

At S200, the controller 29 sets an exit number guidance flag, which corresponds to the process-target circular intersection having the learned road, to OFF. The exit number guidance flag is a flag that, when the learned road is included in the connection roads of the intersection, determines whether the guidance about the exiting road of the circular intersection is to be performed in the form of the exit number guidance.

At S202, from an outside (i.e., an external information provider), the controller 29 acquires an established exit number corresponding to the process-target circular intersection having the learned road. For example, via the communication device 23, the controller 29 may acquire latest information on the exit number assigned to each connection road of the circular intersection by communicating with an information center providing road information or a communication device provided on a road side. Alternatively, the controller 29 may acquire the exit number displayed on a traffic sign at the circular intersection by analyzing an image taken with the camera 25 when the vehicle travels the circular intersection. The exit number from the outside is recorded in a predetermined auxiliary storage medium, so that the exit number acquired from the outside is associated with the circular intersection. The exit number acquired in the above ways is a number that appropriately reflects an arrangement of a new learned road and a prestored road (existing road). Therefore, once the established road number is successfully acquired, the guidance in the exit number mode can be performed at the circular intersection in which both of the learned road and the prestored road are present as the exiting roads.

At S204, the controller 29 determines whether or not the established road number, which corresponds to the circular intersection targeted at S202, has been successfully acquired. When the exit number has been successfully acquired (YES at S204), the process proceeds to S206. At S206, the controller 29 sets the exit number guidance flag corresponding to the circular intersection to ON, and thereafter, the exit number acquisition process is ended. If the acquisition of the exit number ended up in failure for some reasons (NO at S204), the exit number acquisition process is ended.

Figure 6:
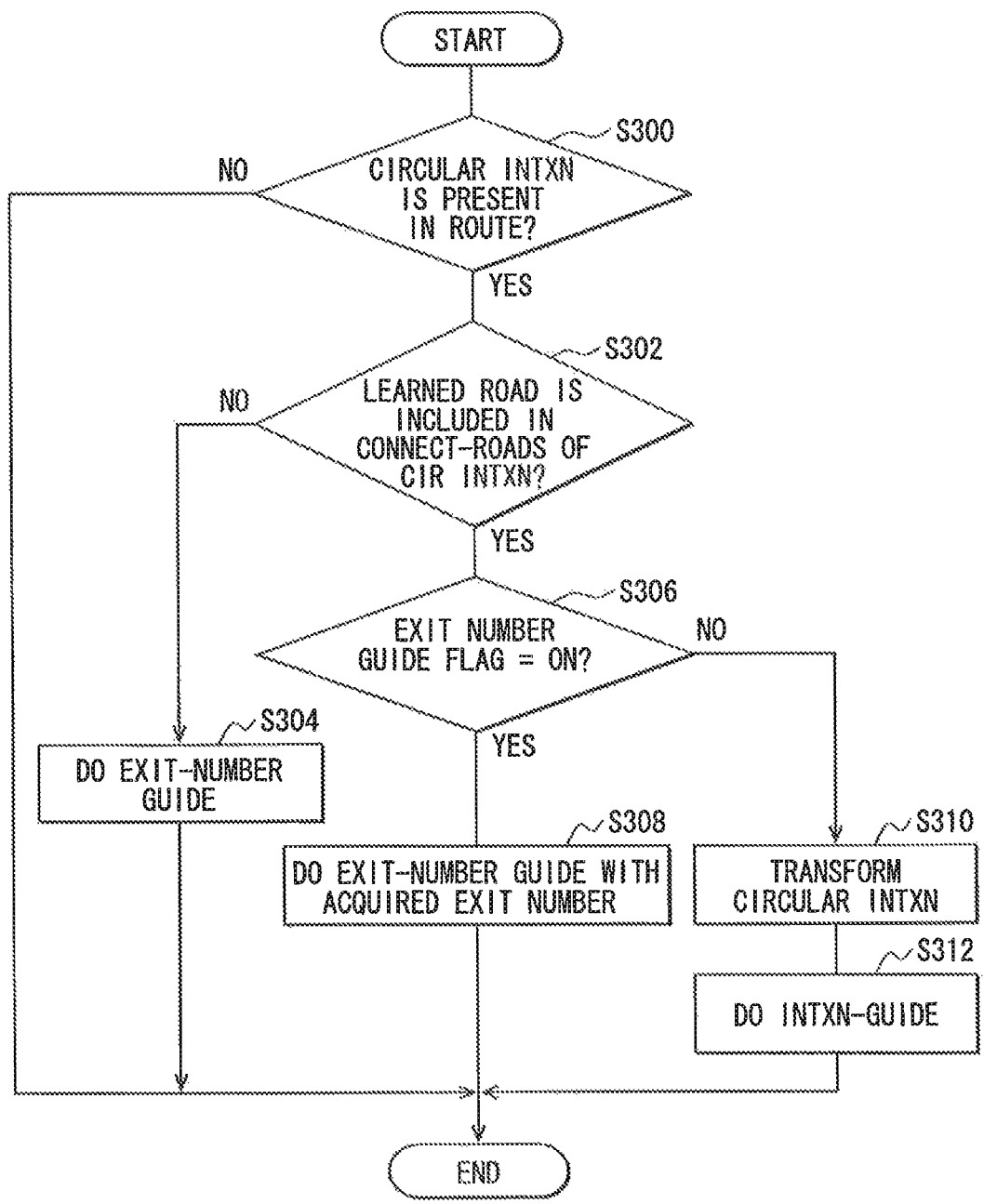
FIG. 6 is a flowchart illustrating a circular intersection guidance process of a second embodiment.

FIG. 6 is a flowchart illustrating a circular intersection guidance process of the second embodiment. This process is performed as part of the route guidance process. The circular intersection guidance process of the second embodiment is different from that of the first embodiment (see FIG. 2) in the use of the exit number guidance flag, which is set in the exit number acquisition process.

At S300, the controller 29 determines whether or not a circular intersection is present in the guidance route from the present position to the destination point. When the circular intersection is present in the guidance route (YES at S300), the process proceeds to S302. When the circular intersection is not present in the guidance route (NO at S300), this circular intersection guidance process is ended.

At S302, the controller 29 refers to the road data about the connection roads of the circular intersection in the guidance route, and determines whether or not there is the learned road that is registered in the learned road data as the connection road of the circular intersection. In other words, the controller 29 determines whether or not the learned road is included in the connection roads of the circular intersection. When the learned road is not included in the connection roads of the circular intersection (NO at S302), in other words, when all the connection roads of the circular intersection are the prestored roads (NO at S302), the process proceeds to S304. When the learned road is included in the roads connected to the circular, intersection (YES at S302), the process proceeds to S306.

At S304, at a time when the vehicle reaches a predetermined distance from the circular intersection, the controller 29 performs an exit number guidance for the circular intersection. This exit number guidance can be the same as the a exit number guidance of the first embodiment. After the exit number guidance, this circular intersection guidance process is ended.

At S306, the controller 29 determines whether or not the exit number guidance flag corresponding to the circular intersection in the guidance route is ON. When the exit number guidance flag is ON (YES at S306), the process proceeds to S308. When the exit number guidance flag is OFF (NO at S306), the process proceeds to S310.

At S308, at a time when the vehicle reaches a predetermined distance from the circular intersection, the controller 29 performs the exit number guidance for the circular intersection by using the exit number of the circular intersection acquired from the outside. This exit number guidance can be substantially the same as the exit number guidance of the first embodiment, except the use of the exit number assigned to the learned road serving as the connection road in addition to the use of the exit number assigned to the prestored road serving as the connection road. After the exit number guidance, this circular intersection guidance process is ended.

As described above, when the exit number guidance flag is OFF, the process proceeds to S310. At S310, a configuration of the circular intersection in the road data, in which the circular part intersects with the connection road, is transformed to another configuration of an intersection, in which a longitudinal road corresponding to the circular part intersects with a lateral road corresponding to the connection road. At S312, at a time, when the vehicle reaches a predetermined distance from the intersection corresponding to the exit of the circular intersection, the intersection guidance in the circular intersection is provided to the user. This intersection guidance can be substantially the same as the intersection guidance of the first embodiment. After performing the circular intersection, this circular intersection guidance process is ended.

MODIFICATION

Embodiments other than the first and second embodiments will be described. In the second embodiment, when the exit number is successfully acquired from the outside in the exit number acquisition process, the exit number guidance is performed for the circular interaction having the learned road as the connation road. As an alternative configuration, it is conceivable that when the new road connected to the circular intersection is acquired by learning, the navigation apparatus independently sets the exit number to this connection road of the circular intersection, and performs the exit number guidance in the circular intersection by using this exit number.

In this regard, however, the use of the independently-set exit number not approved by a user may confuse the user. For addressing this difficulty, the following configuration may be employed. First, in independently setting the exit number to the circular intersection having the learned road, the controller 29 makes an inquiry to a user about whether or not the user approves the exit number. When an user answer given in response to the inquiry through the group of operation switches 22 is the approval, the exit number is registered in association with the circular intersection, and additionally, the exit number guidance flag is set to ON. When a user answer in response to the inquiry is non-approval, the exit number is abandoned and the exit number guidance flag is set to OFF.

After the exit number guidance flag, which is directed to the circular intersection having the learned road, is set in accordance with the user approval and non-approval to the independently-set exit number, the guidance about the exiting road of the circular intersection is performed in substantially the same manner as the circular intersection guidance process of the second embodiment (see FIG. 6).

ADVANTAGE

The navigation apparatus 1 of embodiments involves various advantages, example of which will be described. Depending on whether the learned load is includes in the connection roads of the circular intersection in the guidance route, the guidance about the exiting road is preformed in different manners (different modes). That is, when the learned load is not includes in the connection roads of the circular intersection, the exit number guidance is performed. When the learned load is included in the connection roads of the circular intersection, the intersection guidance is performed. In the intersection guidance, the exit number is not provided to a user. Because of the above, when the learned road connected to the circular intersection is added, the exiting road guidance in the circular intersection does not provide a user with an exit number different from the previous exit, and therefore, there is no concern about user confusion.

In the above embodiments, the controller 29 may include or act as a guidance control device or means, a determination device or means, an exit number setting device or means, and an exit number registration device or means. The controller 29 and the communication device 23, or, the controller 29 and the camera 25 can act as an exit number acquisition device or means. The group of operation switches can act as an acceptance device or means.

According to the present disclosure, a navigation apparatus can be provided in various forms. For example, according to one example, a navigation apparatus performs a route guidance based on a ready-made map data and a learned road data when an own vehicle is traveling. The ready-made map data stores a prestored road. The learned road data stores a learned road. The learned road is generated based on a movement trace of the own vehicle from a point where present position of the own vehicle departs from the prestored road or the already-registered learned road to a point where the resent position of the own vehicle returns to the prestored road or the already-registered learned road.

The navigation apparatus includes a guidance control device and a determination device. When a set guidance route passes through a circular intersection, the guidance control device provides a user with a guidance about an exiting road of the circular intersection at a predetermined timing. The exiting road may be one of the connection roads from which the vehicle is to exit the circular intersection. The determination device determines whether or not the learned road in the learned road data is included in connection roads of the circular intersection serving as a guidance target of the guidance control device, wherein the connection roads of the circular intersection are roads connected to the circular intersection.

When the determination device determines that the learned road in the learned road data is not included in the connection roads of the circular intersection, the guidance control device provides the guidance about the circular intersection in an exit number mode. In the exit number mode, the guidance control device provides the guidance about the exiting road of the circular intersection by providing the user with an exit number of the exiting road from among exit numbers of the connection roads of the circular intersection. When the determination device determines that the learned road in the learned road data is included in the connection roads of the circular intersection, the guidance control device provides the guidance about the circular intersection in a learned road guidance mode. In the learned road guidance mode, the guidance control device provides the guidance about the exiting road of the circular intersection without providing the user with the exit number. The learned road guidance mode is distinct in guidance content from the exit number mode.

According to the above navigation apparatus, the modes of providing the guidance about the exiting, road are distinguished depending on whether or not the learned road, which is obtained by a road learning function, is included in the connection roads of the circular intersection. Specifically, when the learned road is not included in the connection roads of the circular intersection, the navigation apparatus provides a user with the guidance about the circular intersection in the exit number mode by using the exit numbers set to the prestored roads. When the learned road is included in the connection roads of the circular intersection, the navigation apparatus provides a user with the guidance about the circular intersection in the mode in which the exit number is not provided. Because of the above, when the learned road connected to the circular intersection is added, an exit number different from the previous exit number is not provided to the user in the guidance about the exiting road. An occurrence of user confusion is prevented.

The above navigation apparatus may be configured as follows. As the guidance about the exiting road in the learned road guidance mode, the guidance control device provides the user with a position of an exit of the circular intersection and a route direction to the exiting road with respect to a circular part of the circular intersection.

This learned road guidance mode, in which position of an intersection and a route direction are provided to a user, is similar to a guidance mode that is typically employed at a four-way intersection or a three-way intersection (e.g., an intersection of perpendicular roads, an intersection with a traffic signal, and the like). Therefore, the above learned road guidance mode can be a guidance mode familiar to users. As can be seen, when the learned road is included in the connection roads of the circular intersection, the guidance mode is switched from the exit number guidance mode to the mode that is similar to the user-familiar guidance mode. Therefore, the easy-to-understand guidance about the exiting road can be provided to the user.

The above navigation apparatus may be configured as follows. As the guidance about the exiting road in the learned road guidance mode, the guidance control device provides the user with the position of the exit of the circular intersection and the route direction to the exiting road with respect to a circular part of the circular intersection by: (i) transforming the circular intersection into a longitudinal lateral intersection in which a longitudinal road corresponding to the circular part and a lateral road corresponding to the exiting road intersect with each other; and (ii) displaying an intersection map of the longitudinal lateral intersection on a predetermined display of the navigation apparatus. According to this configuration, by using the intersection image (intersection map) that is similar to an image of the intersection of perpendicular roads or the intersection with a traffic signal, it is possible to provide the guidance about the exiting road of the circular intersection in a visually-easy-to-understand way.

The above navigation apparatus may be configured as follows. In providing the guidance about the exiting road in the learned road guidance mode, the guidance control device provides the user with a distance from the present position to the exit of the circular intersection as the position of the exit of the circular intersection. According to this configuration, it is possible to provide the user with the position of the exit of the circular intersection in an easy-to-understand way.

The above navigation apparatus may be configured as follows. The navigation apparatus further includes an exit number acquisition device. The exit number acquisition device acquires, from an external information provider, an established exit number corresponding to an exit of the circular intersection where the learned road is included in the connection roads. The exit number acquisition device records the acquired established exit number while associating the acquired established exit number with the circular intersection. Examples of acquisition manner of the exit number are acquiring the exit number by communicating with an external agency (e.g., information center) providing road information, acquiring the exit number by communicating with a communicating apparatus disposed on a road side, acquiring the exit number by reading out the exit number from a data of an image, which is taken with a camera mount to the own vehicle, of an exit number that is actually displayed in a site of the circular intersection, and the like.

When (i) the learned road in the learned road data is included in the connection roads connected to the circular intersection and (ii) the established exit number corresponding to the exit of the circular intersection has been acquired, the guidance control device provides the guidance about the circular intersection in the exit number mode. When (i) the learned road in the learned road data is included in the connection roads connected to the circular intersection and (ii) the established exit number corresponding to the exit of the circular intersection has not been acquired, the guidance control device provides the guidance about the circular intersection in the learned road guidance mode.

Even when a new connection road provided to a circular intersection is acquired as the learned road, if a formal exit number officially specified as an exit number of the new connection road is successfully identified, the circular intersection guidance can be performed in the exit number mode. This is because the formal exit number acquired from the outside is assigned in appropriate consideration of an arrangement of the new learned road and the previously-existing road (prestored road) and is in no danger of user confusion, whereas the exit number independently set by the navigation apparatus may differ from the actual exit number and an inaccurate guidance about the exiting road may be preformed. Therefore, once the established (formal) exit number is successfully acquired, the circular intersection guidance in the exit number mode can be performed for the intersection in which both of the learned road and the prestored road are present as the exiting roads of the circular intersection.

The above navigation apparatus may be configured as follows. The navigation apparatus may further include an exit number setting device, an acceptance device, and an exit number registration device. The exit number setting device sets an exit number to an exit of the circular intersection where the learned road is included in the connection roads. The acceptance device accepts user's instructions as to whether the exit number set by the exit number setting device is approved. If the exit number is approved according to the user's instructions, the exit number registration device registers the exit number set by the exit number setting device while associating the exit number with the circular intersection. When (i) the learned road in the learned road data is included in the connection roads connected to the circular intersection and (ii) the exit number corresponding to the exit of the circular intersection is registered by the exit number registration device, the guidance control device provides the guidance about the circular intersection in the exit number mode. When (i) the learned road in the learned road data is included in the connection roads connected to the circular intersection and (ii) the exit number corresponding to the exit of the circular intersection is not registered by the exit number registration device, the guidance control device provides the guidance about the circular intersection in the learned road guidance mode.

It is conceivable that when the learned road acquired by the road learning function is added as the connection road to the circular intersection and when the navigation apparatus independently sets the exit number to the circular intersection, the circular intersection guidance in the exit number guidance is allowed to be preformed as long as the user approves the exit number independently set by the navigation apparatus. Additionally, according to the above configuration, since the user can decide whether or not the circular intersection guidance in the exit number mode is performed at the circular intersection having the learned road, it is possible to improve usability.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A navigation apparatus for performing a route guidance based on a ready-made map data and a learned road data when a vehicle is traveling, wherein the ready-made map data includes a prestored road, wherein the learned road data includes a learned road, wherein a new road is detected and registered as the learned road in the learned road data based on a movement trace of the vehicle from a point where a present position of the vehicle departs from the prestored road or an already-registered learned road to a point where the present position of the vehicle returns to the prestored road or the already-registered learned road, the navigation apparatus comprising:

a guidance control device that, when a set guidance route passes through a circular intersection, provides a user with a guidance about an exiting road of the circular intersection at a predetermined timing; and a determination device that determines whether or not the learned road in the learned road data, which was detected and registered based on the movement trace of the vehicle mounted with the navigation apparatus comprising the determination device, is included in connection roads of the circular intersection serving as a guidance target of the guidance control device, wherein each of the connection roads of the circular intersection is the prestored road or the already registered learned road and is connected to the circular intersection, wherein:

when the determination device determines that the learned road in the learned road data is not included in the connection roads of the circular intersection, the guidance control device provides the guidance about the circular intersection in an exit number mode;

when the determination device determines that the learned road in the learned road data is included in the connection roads of the circular intersection, the guidance control device provides the guidance about the circular intersect on in a learned road guidance mode;

in the exit number mode, the guidance control device provides the guidance about the exiting road of the circular intersection by providing the user with an exit number of the exiting road from among exit numbers of the connection roads of the circular intersection to indicate from which of the connection roads the vehicle is to exit the circular intersection;

in the learned road guidance mode, the guidance control device provides the guidance about the exiting road of the circular intersection without providing the user with the exit number; and the learned road guidance mode is distinct in a guidance content from the exit number mode.

2. The navigation apparatus according to claim 1, wherein:

in providing the guidance about the exiting road in the learned road guidance mode, the guidance control device provides the user with a position of an exit of the circular intersection and a route direction to the exiting road with respect to a circular part of the circular intersection.

3. The navigation apparatus according to claim 2, wherein:

in providing the guidance about the exiting road in the learned road guidance mode, the guidance control device provides the user with the position of the exit of the circular intersection and the route direction to the exiting road with respect to a circular part of the circular intersection by:

transforming the circular intersection into a longitudinal lateral intersection in which a longitudinal road corresponding to the circular part and a lateral road corresponding to the exiting road intersect with each other; and displaying an intersection map of the longitudinal lateral intersection on a predetermined display of the navigation apparatus.

4. The navigation apparatus according to claim 2, wherein:

in providing the guidance about the exiting road in the learned road guidance mode, the guidance control device provides the user with a distance from the present position to the exit of the circular intersection as the position of the exit of the circular intersection.

5. The navigation apparatus according to claim 1, further comprising:

an exit number acquisition device that acquires, from an external information provider, an established exit number corresponding to an exit of the circular intersection where the learned road is included in the connection roads, and records the acquired established exit number while associating the acquired established exit number with the circular intersection, wherein:

the guidance control device provides the guidance about the circular intersection in the exit number mode when the learned road in the learned road data is included in the connection roads connected to the circular intersection and the established exit number corresponding to the exit of the circular intersection has been acquired; and the guidance control device provides the guidance about the circular intersection in the learned road guidance mode when the learned road in the learned road data is included in the connection roads connected to the circular intersection and the established exit number corresponding to the exit of the circular intersection has not been acquired.

6. The navigation apparatus according to claim 1, further comprising:

an exit number setting device that sets an exit number to an exit of the circular intersection where the learned road is included in the connection roads;

an acceptance device that accepts instructions from the user as to whether the exit number set by the exit number setting device is approved; and an exit number registration device that registers the exit number set by the exit number setting device while associating the exit number with the circular intersection, when the exit number is approved according to the instructions from the user, wherein:

the guidance control device provides the guidance about the circular intersection in the exit number mode when the learned road in the learned road data is included in the connection roads connected to the circular intersection and the exit number corresponding to the exit of the circular intersection is registered by the exit number registration device; and the guidance control device provides the guidance about the circular intersection in the learned road guidance mode when the learned road in the learned road data is included in the connection roads connected to the circular intersection and the exit number corresponding to the exit of the circular intersection is not registered by the exit number registration device.

* * * * *